United States Patent [19]

Hu et al.

[11] Patent Number: 5,734,538
[45] Date of Patent: *Mar. 31, 1998

[54] TAPE CARTRIDGE WITH INCREASED STORAGE CAPACITY

[75] Inventors: Xiaohong Hu; Rayburn Johnson, both of San Diego, Calif.

[73] Assignee: Gigatek, Inc., La Costa, Calif.

[ * ] Notice: The term of this patent shall not extend beyond the expiration date of Pat. No. 5,543,992.

[21] Appl. No.: 676,635

[22] Filed: Jul. 10, 1996

Related U.S. Application Data

[63] Continuation of Ser. No. 384,150, Feb. 6, 1995, Pat. No. 5,543,992.

[51] Int. Cl.$^6$ ................................................. G11B 23/02
[52] U.S. Cl. ................................................. 360/132
[58] Field of Search ............................ 360/132; 242/192

[56] References Cited

U.S. PATENT DOCUMENTS

| | | | |
|---|---|---|---|
| 4,146,194 | 3/1979 | Majicek | 242/192 |
| 4,172,569 | 10/1979 | Newell | 242/192 |
| 4,205,808 | 6/1980 | Hurtig et al. | 242/192 |
| 4,219,169 | 8/1980 | Majicek | 242/192 |
| 4,262,860 | 4/1981 | Hurtig et al. | 242/192 |
| 4,275,424 | 6/1981 | Maxey | 360/132 X |
| 4,447,019 | 5/1984 | Nagorski | 242/192 |
| 4,474,342 | 10/1984 | Nater | 242/192 |
| 5,239,436 | 8/1993 | Aizawa et al. | 360/132 |
| 5,335,131 | 8/1994 | Sato et al. | 242/347 |
| 5,543,992 | 8/1996 | Hu et al. | 360/132 |

*Primary Examiner*—John H. Wolff
*Attorney, Agent, or Firm*—Brown, Martin, Haller & McClain, LLP

[57] ABSTRACT

A belt-driven tape cartridge has a rectangular housing with a front wall shorter than its side walls. The front wall has an access opening for a tape read/write head and a drive opening. A pair of tape spools are rotatably mounted in the housing so as to lie on an axis oriented at an angle to the front wall, and a plurality of tape guides define a tape path between the spools and across the access opening. An endless drive belt extends around a drive roller at the drive opening and at least three belt guide rollers in a belt path arranged to contact tape on each spool. The tape path has extended portions extending between the tape contacting portions on each side of the spools. At least one belt guide roller is located in the same extended portion of the belt path as the drive roller, and at least two belt guide rollers are located in the other extended portion of the belt path.

30 Claims, 2 Drawing Sheets

TAPE CARTRIDGE WITH INCREASED STORAGE CAPACITY

This is a continuation of application Ser. No. 08/384,150 filed Feb. 6, 1995 now U.S. Pat. No. 5,543,992.

BACKGROUND OF THE INVENTION

The present invention relates generally to tape cartridges in which tape is driven back and forth between two rotatable hubs, and is particularly concerned with belt driven, magnetic data tape cartridges of the type used in association with computers and the like.

Magnetic data tape cartridges are available in two basic sizes, the 5¼" standard cartridge and the 3½" mini cartridge, for fitting in conventional drive units. A typical mini, magnetic data tape cartridge is a rectangular housing in which a pair of rotatable tape spools or hubs are mounted. The spools are aligned on an axis parallel to the front wall of the housing in which the tape drive and tape read/write openings are located. The tape is driven between the spools by means of a flexible elastic drive belt which extends around a drive roller at the front of the housing and contacts the tape on the two spools before extending around a pair of corner rollers. The drive belt is moved by rotating the drive roller in order to move the tape between the spools. The cartridge is inserted in a tape drive in order to read data from the tape or write data onto the tape.

Typical tape drive software, until recently, has required a fixed tape length, such as 300 feet for the mini size cartridge. Additionally, the amount of tape which can be accommodated in the relatively small, conventional mini cartridge is limited by the maximum separation permitted between the two spools. However, tape drive software now permits variable tape lengths, and by increasing the length of tape in the housing, the amount of data which may be stored is increased. There is a need for tape cartridges capable of holding a greater length of tape. Some enlarged tape cartridges for holding double the normal length of tape have been proposed, but these require modification of the drive to receive the larger cartridge.

SUMMARY OF THE INVENTION

It is an object of the present invention to provide a new and improved belt driven tape cartridge for holding a longer length of tape to provide increased storage capacity.

According to the present invention, a belt-driven tape cartridge is provided which comprises a rectangular housing having a front wall in which a tape read/write head access window is located and spaced side walls, a pair of tape spools rotatably mounted in the housing with their centers aligned on an axis which extends in a direction at an angle to the front wall, a plurality of tape guides for guiding the tape between the spools and across the access window, a drive roller and at least three belt guide rollers rotatably mounted in fixed positions in the housing, an endless drive belt extending around the drive roller and additional rollers to contact tape on each of the spools in a belt path having a first tape contacting portion contacting tape on one of the spools, a second tape contacting portion contacting tape on the other spool, a first extended portion extending between the first tape contacting portion and the second tape contacting portion, and a second extended portion extending from the second tape contacting portion back to the first tape contacting portion, and the additional rollers include at least one belt guide roller in the first extended portion of the belt path with said drive roller and at least two belt guide rollers in the second extended portion of the belt path.

The side walls are preferably longer than the front wall of the housing. By making the sides of the housing longer while keeping the same cartridge width, the cartridge can fit in a conventional tape drive, and by aligning the tape spools in an orientation non-parallel to the front wall in combination with the increased length of the cartridge, the separation between the centers of the spools can be increased, thereby permitting a greater length of tape to be wound on the spools. The length of the cartridge is preferably increased to at least 4", and it may be 5" or more in length, allowing tape length to be increased to between 750' and 1200' or more. This significantly increases the amount of data which may be stored on a cartridge.

By providing at least two rollers in the extended belt path portions between the spool contacting portions on each side of the spools, i.e. the drive roller and one belt guide roller in the first extended portion and two belt guide rollers in the second extended portion, there is less of a difference in the length of drive belt in the two extended belt path portions between the tape contacting portions on each side of the alignment axis than in other tape cartridges designed to hold a longer than standard length of tape, providing more uniform drive in opposite drive directions. Additionally, the tape contacting or drive sections of the belt are not immediately adjacent to one another but are separated by the first and second extended belt sections which each extend between at least two rollers. If a first length of drive belt is measured from the center of the first tape contacting portion through the first extended portion to the center of the second tape contacting portion, and a second length of drive belt is measured from the center of the second tape contacting portion through the second extended portion to the center of the first tape contacting portion, the ratio of the first length to the second length is preferably of the order of 30% to 70% up to 50% to 50%, i.e. close to equal belt lengths on opposite sides of the pair of spools. The belt is of the order of 14" in length for a cartridge having a width equal to that of a conventional mini cartridge, as opposed to the 9" drive belt of a conventional 3½" mini cartridge.

By skewing the spool alignment axis from a direction parallel to the front wall of the housing to an orientation at an angle to the front wall of the housing, the difference in the tape path length from each spool to the read/write access window can be reduced, making operation more even. The tape spools may be skewed such that the path length from each spool to the tape head is equal by rotating the spool orientation in a clockwise direction relative to the parallel orientation of a conventional mini cartridge. Thus, the spool which is normally closest to the tape head is moved away from the head. However, different orientations may be preferred to allow a greater separation between the tape spools and thus permit a greater length of tape to be stored in the cartridge. The angle of the spool alignment axis relative to the front wall of the housing may be between 40° and 90°, with a 90° angle permitting the maximum spool separation while a smaller angle provides less difference between the tape path lengths. The angle is preferably between 55° and 80°.

The drive belt rollers are preferably positioned such that the included wrap angle of the belt around each spool, i.e. the angle formed between the belt paths on opposite sides of the spool immediately adjacent the tape contacting portion of the belt, is preferably less than 120°, in order to provide the necessary drive force to move the tape properly and to resist tape slippage. The maximum wrap angles around each spool will be determined by the relative positions of the center of each spool and the next adjacent rollers in the drive belt path on opposite sides of the spool. The wrap angle will increase as the amount of tape on the spool decreases. The maximum wrap angle is preferably in the range of 90° to 120°.

With this arrangement, the amount of tape in the cartridge can be increased to up to four times that of the conventional mini cartridge while the cartridge will still fit in a standard tape drive housing without modification to the cartridge receiving slot in the tape drive. This allows a significant increase in the amount of data which can be stored.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
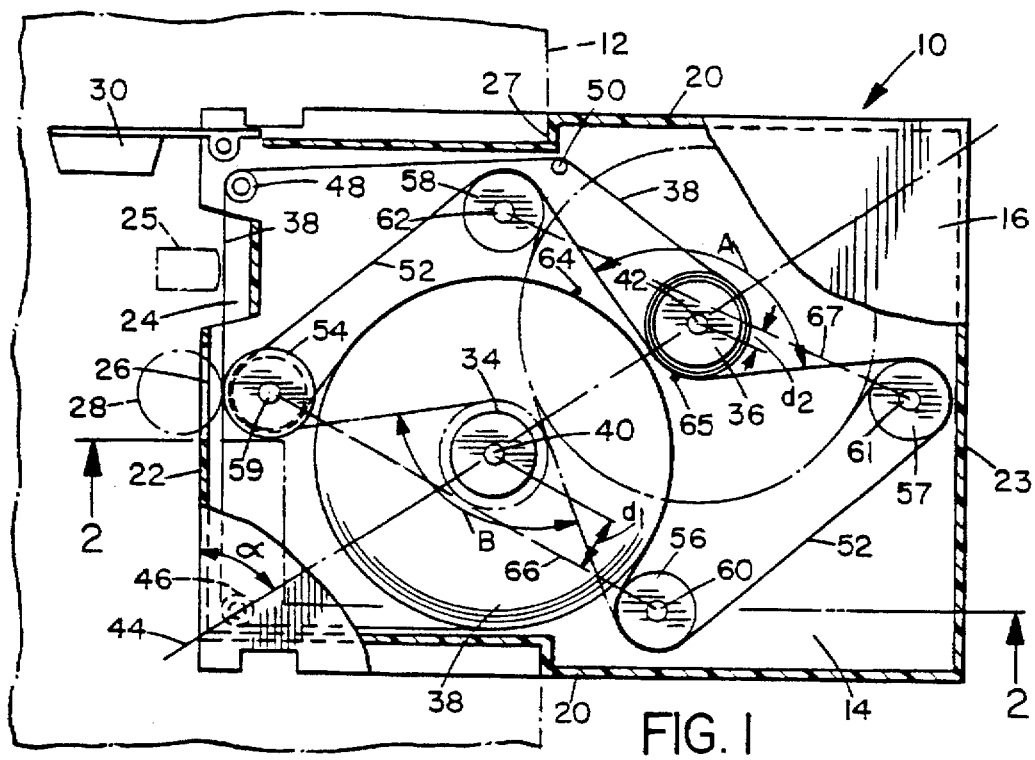
FIG. 1 is a top plan view, partially cut away, of a cartridge incorporating the improved drive belt arrangement.
Figure 2:
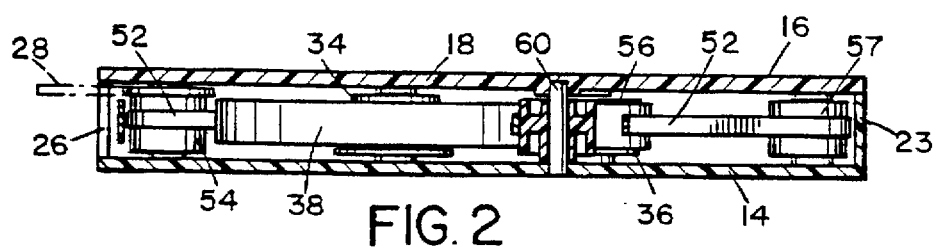
FIG. 2 is a sectional view taken on line 2—2 of FIG. 1.

FIGS. 1 and 2 of the drawings illustrate a tape cartridge 10 of the belt driven type according to a first embodiment of the invention for fitting into a cartridge receiving slot of a conventional tape drive unit 12, as indicated in dotted outline in FIG. 1. Cartridge 10 comprises a rectangular outer housing having a flat base plate 14 of metal or plastic and a cover 16 having an upper wall 18 and downwardly depending peripheral sides, front walls and rear walls 20,22 and 23 forming a generally rectangular enclosure for the various components of the tape cartridge. The front wall 22 has a conventional access window or recess 24 for receiving a tape read/write head 25, as well as an access opening 26 for tape drive roller 28 of the drive unit 12. A conventional write protect device (not illustrated) and window (not illustrated) for passing optical signals identifying tape position will also be provided in the front wall. A conventional pivoted door 30 is mounted on the front wall for closing the access window 24 when the cartridge is not in use. As illustrated, the cartridge is elongated over conventional belt driven tape cartridges, with the side walls 20 of the cartridge being longer than front wall 22, unlike conventional cartridges in which the sides are shorter. However, the cartridge width is the same as that of a conventional cartridge, so that it will fit a conventional drive unit 12.

The side walls 20 are recessed inwardly from the side edges of the base plate 14 at the front portion of the cartridge, in the conventional manner as required by the conventional drive inlet or guides for a tape drive unit for receiving conventional 3½" mini cartridges. An outward step 27 towards the outer edge of the base plate is provided in each side wall at a location which will be located just outside the drive unit, as illustrated in FIG. 1, when the cartridge is inserted in the standard receiving slot. The side walls 20 extend from step 27 back to rear wall 23, and the separation between the side walls is therefore greater outside the drive unit, providing increased area within the housing for locating drive and tape guide components. Although the side walls are straight and the width of the cartridge is uniform in the illustrated embodiment, the cartridge may be made wider in the region which is outside the drive unit 12, if desired, to provide even more room within the housing for increased lengths of tape.

The housing contains a plurality of tape guiding and driving components in a layout as illustrated in FIG. 1 which is designed to permit a greater length of tape to be accommodated than was previously possible, while maintaining adequate tape driving forces. In a conventional, rectangular mini or 3½" data tape cartridge, tape carrying spools are aligned on an axis parallel to the front wall. In the housing as illustrated in FIG. 1, a pair of tape carrying spools 34,36 on which tape 38 is wound are rotatably mounted on spool pins 40,42 which are mounted on base plate 14 and each lie on an axis 44 extending at an angle $\alpha$ to the front wall of the housing. The spools are therefore skewed relative to the housing into an orientation which is not parallel to either the front wall or sides of the housing. By skewing the spools in a direction non-parallel to the front wall and lengthening the sides of the housing, the separation between the centers of the two spools can be increased, allowing a greater diameter of wound tape on the spools, and thus a longer overall length of tape. Preferably, the angle $\alpha$ is between 50° and 70°. By widening the housing in the region rear of step 27, the center separation can be increased even further.

Tape is guided from the first tape spool 34 in a tape path extending around tape guide pin 46 at one front corner of the housing, across the front wall and tape head recess 24, around a second tape guide pin 48 at the opposite front corner, around a further guide pin 50 to the second tape spool 34. Tape is wound back and forth between the two spools along this guide path by a tape drive assembly comprising an endless drive belt 52 extending around drive roller 54 and fixed drive belt rollers 56,57 and 58 in a belt path of the bow tie configuration generally illustrated in FIG. 1. The belt path has a first tape contacting portion on spool 34, a second tape contacting portion on spool 36, a first extended portion on one side of the spools extending from the first tape contacting portion around drive roller 54 and belt guide roller 58 to the second tape contacting portion, and a second extended portion extending from the second spool contacting portion around belt guide rollers 57 and 56 back to the first spool contacting portion. It will be understood that the belt path configuration will vary as the diameter of tape wound on one spool decreases and the other increases. In the configuration illustrated in FIG. 1, the first spool has close to the maximum amount of tape wound on it while the diameter of windings on spool 36 is much less, and is close to the minimum diameter. Another configuration in which the first spool is at or close to minimum winding diameter is illustrated in dotted outline in FIG. 1. The belt path will therefore vary between the solid line and dotted line configurations of FIG. 1.

The positioning of the drive roller 54 and additional drive belt rollers 56,57 and 58 is such that the belt extends around at least two rollers between each tape contacting portion of the belt. Thus, the drive roller 54 and at least one additional roller 58 are located in the first extended belt path portion on one side of the spools while at least two additional rollers 56 and 57 are located in the second extended belt path portion on the opposite side of the spools. Each of the rollers is rotatably mounted on a fixed roller mounting pin 59,60,61 and 62, respectively. The roller mounting pins are secured in the base plate 14 as generally illustrated in FIG. 2, in any conventional manner. The various rollers around which belt 52 extends are also positioned such that the maximum wrap angle A of the belt around the tape spool (i.e. the wrap angle when the tape windings approach the minimum diameter) is preferably less than 120°, to reduce the risk of tape slippage.

The drive belt path extends from drive roller 54, around part of the outer periphery of tape wound on first spool 34, around the two drive belt rollers 56 and 57, then around part of the outer periphery of the tape wound on the second spool 36, around drive belt roller 58, and then back to the drive roller 54. The length of the two extended drive belt portions is closer to equal than in other enlarged tape cartridges, which typically have much more drive belt in one extended portion of the path than the other. By providing more equal lengths of drive belt on each side of the spools, tape tension and tangential drive force (TDF) will be more nearly equal in the opposite drive directions. Preferably, if a first length $L_1$ of drive belt is measured from the center or apex 64 of the first tape contacting portion of the belt, over rollers 54 and 58 to the center or apex 65 of the second tape contacting portion of the belt, and a second length $L_2$ is measured from point 65, around rollers 57 and 56 and back to point 64, the ratio $L_1:L_2$ is of the order of 50%:50% to 40%:60%. The length of the drive belt will be around 14" if the cartridge is intended to fit a conventional mini drive inlet.

The relative positions of the drive roller 54, spool 34 and belt roller 56 will determine the wrap angle B of the belt extending around spool 34, while the relative positions of the rollers 57 and 58 and spool 36 will determine the belt wrap angle A around spool 36. Clearly the wrap angles will vary as the tape is driven back and forth. The maximum wrap angles A and B are illustrated in solid and dotted outline, respectively, in FIG. 1. It is important that these angles are not too large, since that would mean a relatively short contact length between the belt and tape and possible tape slipping. Preferably, the maximum wrap angles A and B are each less than 120°.

In FIG. 1, the length of the tape path from each spool to the tape head at access opening 24 is close to equal, which helps to provide more uniform operation in opposite drive directions, since the distance the tape has to travel from each spool to reach the tape head is approximately the same. This is achieved by skewing the spools relative to the spool orientation of a conventional cartridge in a clockwise direction or viewed from the top of the cartridge, such that the first spool 34 is moved closer to the tape head and the second spool 36 is moved farther away from the tape head. In other words, the spool orientation is rotated in a clockwise direction, as viewed in FIG. 1, relative to that of a conventional tape cartridge. At the same time, the separation between the spools is increased to permit a longer length of tape to be stored. The relative positions of the belt guiding rollers and tape guiding rollers are arranged such that the belt does not extend alongside the tape path for any significant distance. Preferably, the closest distance the belt approaches the tape path is no closer than ⅛", and the belt is this close to the tape for a distance of no more than 0.25". This reduces the risk of any buildup of electrostatic charge.

When the cartridge 10 is inserted in the inlet slot of a tape drive unit 12, as indicated in FIG. 1, door 30 will open in a conventional manner and read/write head 25 will extend into the recess 24 to contact tape 38. At the same time, the motor-driven driving roller 28 of the drive unit will contact the rim of belt drive roller 54 as illustrated in FIG. 2. Roller 54 will be driven in an anti-clockwise or forward direction, simultaneously driving the belt 52 to move in a first direction about rollers 56,57 and 58, respectively. The movement of the belt contacting the tape on spools 34 and 36 will simultaneously cause the spools to rotate in a clockwise direction, moving tape from spool 34 to spool 36 in the tape path in a first direction across the recess 24. Once all the tape is wound in the forward direction from spool 34 onto spool 36, as indicated in dotted outline in FIG. 1, the motor reverses the direction of roller 54, and the belt is moved in the opposite direction to drive spools 34 and 36 in an anti-clockwise direction and thus move the tape in the opposite direction along the tape path from spool 36 back onto spool 34. If required, the belt roller 58 may be suitably linked to the drive roller 54 so that both rollers are driven.

In a conventional mini or 3½" data tape cartridge, the width of the cartridge across the front wall is around 3.18" while the length of the sides is around 2.4". In one example of the embodiment illustrated in FIG. 1, the cartridge width is the same as that of a conventional mini cartridge, while the length of the sides is increased to 4.29". The spools are aligned on axis 44 at an angle of around 58° to the front wall, and the distance between the centers of the spools is about 1.37", allowing storage of up to 850 feet of minimum thickness, conventional magnetic data tape on the spools, i.e. a maximum diameter of wound tape of the order of 2". The various belt rollers 54,56,57 and 58 are positioned so that they will be outside the wound tape on either spool when it is at its maximum diameter. Drive roller 54 is located in the conventional position at the drive opening 26; while roller 56 is located adjacent one side wall 20 of the housing at a distance of around 2.5" from drive roller 54 on the opposite side of spool 34. A line 66 connecting the rollers 54 and 56 is offset by a distance $d_1$ of around 0.37" from the center of spool 34. Roller 57 is located adjacent the center of the rear wall 23 of the housing at a distance of around 1.75" from roller 56. Roller 58 is located adjacent the opposite side of the housing to roller 56 and on the same side of the spools as drive roller 54, at a distance of around 2.6" from roller 57 and 1.5" from drive roller 54. A line 67 connecting the centers of rollers 57 and 58 is offset a distance $d_2$ of around 0.19" from the center of spool 36. Maximum wrap angle A of the belt around spool 36 is then around 120°, while the maximum wrap angle B around spool 34 is around 101°.

The increased length of the cartridge 10, together with the relative positioning of the two spools, the tape path configuration and the drive belt configuration, allows nearly three times the length of tape to be stored in the cartridge than was possible with a conventional mini cartridge, and thus significantly increases data storage capacity. The cartridge may be used with conventional or new drive units which have software permitting variable tape length. The layout of the tape path and the belt path as illustrated in FIG. 1 also avoids having the belt run alongside the tape for any significant distance and thus reduces the risk of any build up of electrostatic charge which may otherwise interfere with proper operation of the cartridge. The layout of the tape path in FIG. 1 also provides a tape path length of approximately 7" from the point at which tape leaves spool 36 to the point at which tape arrives at spool 34 when the majority of the tape is wound on spool 34 as illustrated.

Figure 3:
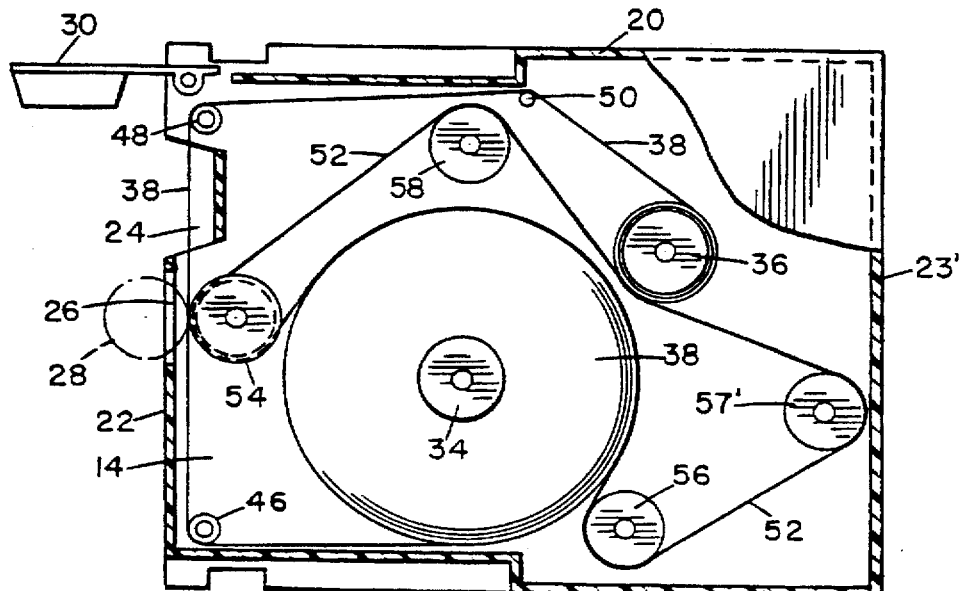
FIG. 3 is a view similar to FIG. 1, showing an alternative tape drive.

FIG. 3 of the drawings illustrates a modified cartridge layout which is identical in some respects to that of FIGS. 1 and 2, and like reference numerals have been used for like parts as appropriate. The only difference between the first embodiment and that of FIG. 3 is that the length of the cartridge is reduced, and the position of one of the belt drive rollers 57' is changed. The cartridge of FIG. 3 is designed to hold up to 750 feet of tape, and the cartridge length is 4". Roller 57' is shifted from the central position of FIG. 1 to a position adjacent the rear wall but closer to one side wall of the housing. Rollers 56 and 57' will therefore be closer together than in the previous embodiment, and wrap angle A will be different. However, operation will be otherwise identical to that described above in connection with FIGS. 1 and 2.

Figure 4:
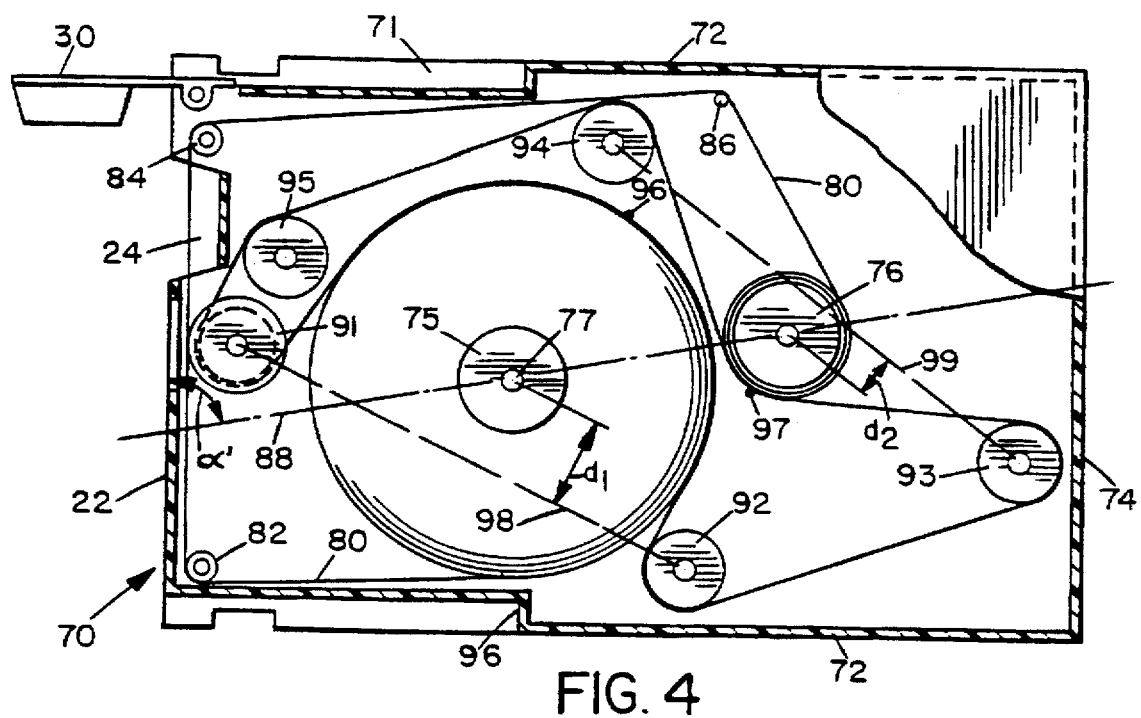
FIG. 4 is a similar view showing a further configuration of the tape drive in a longer cartridge.

FIG. 4 illustrates another modified cartridge 70 for holding an even greater length of tape. As in the first embodiment, the cartridge comprises an outer housing formed by a base plate 71 of metal or plastic and an upper cover member with downwardly depending peripheral walls secured to the base plate. The housing has spaced side walls 72, rear wall 74, and a front wall 22. Front wall 22 is identical to that of the first two embodiments, and like reference numerals have been used for like parts as appropriate. However, the length of the housing is extended over that of the previous embodiments, and the layout of the various tape and tape drive components is also different.

A pair of tape carrying spools 75,76 are rotatably mounted in the housing on fixed pins 77,78 and a length of data recording tape 80 is wound between the two spools. Tape 80 extends from spool 75 around guide pin 82 at one front corner of the housing, across the front of the housing through recess 24, around guide pin 84 at the opposite corner, and around guide pin 86 to spool 76. Guide pin 86 is positioned farther from the front wall 22 than the equivalent guide pin 50 in the previous embodiments. The tape carrying spools 75,76 are aligned on an axis 88 extending at an angle α' of about 80° to the front wall 22, in other words close to perpendicular to the front wall. In view of the increased length of the housing and the angle of alignment of the spools 75 and 76, the separation between the spools is increased and thus the cartridge 70 can carry more tape than the cartridges of FIGS. 1-3.

As in the previous embodiments, tape is driven between the spools and across the access window 24 by means of an endless, flexible belt 90 which extends around drive roller 91 at window 28, around the tape wound on spool 75, around drive belt rollers 92,93 on the opposite side of tape alignment axis 88, and then around spool 76, drive belt rollers 94,95, and back to the drive roller 91. This forms a drive belt path having a first extended portion between spool 75 and spool 76 around drive roller 91 and rollers 94 and 95 on one side of the spools, and a second extended portion between spool 76 and spool 75 around rollers 93 and 92 on the opposite side of the spools. In this embodiment, there are four drive belt guide rollers in addition to the drive roller 91, unlike the previous embodiments in which there were only three additional belt guide rollers. This is due to the greater diameter of tape wound on the spool 75 when at its maximum diameter as illustrated in FIG. 4, requiring the first extended portion of the belt to be redirected around roller 95 rather than directly from roller 94 to roller 91, so that it will be clear of the tape when the maximum amount is wound on spool 75. The separation between rollers 92 and 93 is greater than the separation between the equivalent rollers 56 and 57 in the previous embodiment, due to the increased length of the housing, so that the length of drive belt on opposite sides of the spool alignment axis 88 will still be closer to equal than in prior art cartridges. As noted above, this will provide more uniform tape tension and tangential drive force in the opposite drive directions, providing more uniform drive of the tape in forward and reverse directions.

In one example of a cartridge having the layout illustrated in FIG. 4, the length of the housing was 5" and the separation between spools 75 and 76 was around 1.56". This will allow a maximum tape winding diameter of the order of 2.5", corresponding to a length of 1200 feet of the thinnest magnetic data tape to be wound on the spools, in other words up to four times that of conventional mini cartridges. As in the previous embodiment, the tape path length from the respective spools to the read/write head is closer to equal than in prior art cartridges, which also provides more uniform operation in the opposite drive directions. The wrap angles at minimum tape winding diameter for spool 75 will be around 96.6° and for spool 76 will be 120°. The ratio of the length $L_1$ of the extended drive belt portion between the centers 96,97 of the tape contacting portions on the drive roller side of the spools and the length $L_2$ between the centers 97,96 on the opposite side of the spools will be of the order of 55% to 45%, and may be anything from 70% to 30% to 50% to 50%. The total belt length in this embodiment is around 14" to 16" for a cartridge of dimensions for fitting a conventional mini cartridge receiving slot of a drive unit.

The drive roller 91 is positioned adjacent the front wall 22 in the equivalent position to drive roller 54 in the first embodiment. The belt rollers 92 and 93 are positioned adjacent one side wall 72 and the rear wall, respectively. The relative positions of roller 91 and 92 determine the wrap angle of the drive belt around spool 75. In the above example, the separation between rollers 91 and 92 was about 2.75" and the line 98 joining these rollers was offset a distance $d_1$ of around 0.5" from the center of spool 75. The separation between rollers 92 and 93 was about 1.9". The relative positions of rollers 93 and 94 determine the wrap angle around spool 76. In the above example, the distance between rollers 93 and 94 was around 2.9" and the line 99 joining these rollers was offset a distance $d_2$ of around 0.2-0.3" from the center of spool 76. Roller 95 is preferably positioned such that the belt path does not extend adjacent the tape path for any significant distance, as in the previous embodiments. The layout of the tape path in FIG. 4 provides a tape path length of approximately 8.56" from the point at which tape leaves spool 76 to the point at which tape arrives at spool 75 when the majority of the tape is wound on spool 75 as illustrated.

As in the previous embodiment, drive roller 91 is rotated in one direction to wind tape from spool 75 onto spool 76, and in the opposite direction to wind tape back from spool 76 onto spool 75. Rotation of roller 91 will drive the belt back and forth along the belt path, and the portions of the belt contacting the tape will act to drive the tape correspondingly in opposite directions along the tape path. A drive linkage may be provided between rollers 91 and 95, and rollers 95 and 94, if necessary. The cartridge of FIG. 4 is also designed so that its forward end will fit into the receiving slot of a conventional tape drive unit, in the same manner as the forward end of the cartridge 10 of FIG. 1, and has the required, standard width and side edge configuration for fitting the drive unit in the portion of the housing forward of step 96 in the side wall, which is equivalent to step 27 in the previous embodiment. Thus, no mechanical changes to the drive unit will be necessary to accommodate the cartridge, only software changes to accommodate a greater length of tape.

Thus, by making the housing less than 1" longer than in the embodiment of FIG. 1, and suitable positioning of the tape spools, the drive belt and tape paths, the tape storage capacity can be increased from 850' to 1200'. Although a large amount of tape can be stored, the housing is still relatively compact. In each embodiment, the length of the extended portions of the drive belt between the tape contacting portions on opposite sides of the spools is closer to equal than in conventional data tape cartridges, providing more uniform drive characteristics in the opposite drive directions. The increased length of tape allows a significantly greater amount of data to be stored on the cartridge.

The above embodiments relate to enlarging a conventional 3½" mini cartridge to hold more tape. However, the same principles may also be used to enlarge a standard, 5¼" data tape cartridge to increase the length of tape which may be stored in such cartridges.

Although some preferred embodiments of the invention have been described above by way of example only, it will be understood by those skilled in the field that modifications may be made to the disclosed embodiments without departing from the scope of the invention, which is defined by the appended claims.

We claim:

1. A belt-driven tape cartridge, comprising:

an outer housing having a front wall, spaced side walls and a rear wall, the front wall having an access opening for receiving a tape read/write head and a drive opening for receiving a driving roller;

first and second tape spools adapted to rotate in the housing, each spool having a center aligned on an alignment axis with the center of the other spool, the spool alignment axis extending at an angle to the front wall of the housing;

a tape wound on said spools;

a plurality of tape guides for guiding said tape between the spools along a tape path extending across the access opening;

a drive roller at said drive opening and at least three belt guide rollers rotatably mounted at fixed positions in the housing;

an endless drive belt encircling said drive roller and belt guide rollers in a belt path comprising a first tape contacting said portion contacting tape on the first spool, a second tape contacting said portion contacting tape on the second spool, a first extended portion extending from said first tape contacting portion around said drive roller and at least one belt guide roller to said second tape contacting portion and a second extended portion extending from said second tape contacting portion around at least two belt guide rollers to said first tape contacting portion, whereby movement of the drive belt in opposite directions will move tape back and forth between the spools and across the access opening;

the length of the housing in a direction perpendicular to the front wall being greater than the width of the housing measured across the front wall of the housing;

the housing has a forward end portion having a width of approximately 3.18"; and the length of the housing being in the range from approximately 4" to approximately 5".

2. The cartridge as claimed in claim 1, wherein the ratio of the length of drive belt between the centers of the tape contacting portions in the first extended portion of the belt path to the length of drive belt between the centers of the tape contacting portions in the second extended portion of the belt path is in the range from 30%:70% up to 70%:30%.

3. The cartridge as claimed in claim 2, wherein the ratio is 55%:45%.

4. The cartridge as claimed in claim 1, wherein the housing has a base plate having a width which is substantially uniform along its length.

5. The cartridge as claimed in claim 1, wherein the cartridge has a forward portion of predetermined shape and dimensions for fitting a standard drive unit.

6. The cartridge as claimed in claim 1, wherein the spool alignment axis is oriented at an angle of between 50° and 70° to the front wall of the housing.

7. The cartridge as claimed in claim 1, wherein the spool alignment axis is oriented at an angle of 80° to the front wall of the housing.

8. The cartridge as claimed in claim 1, wherein the housing has a forward portion of predetermined dimensions for fitting a standard mini cartridge drive unit, and the length of the drive belt is at least 14".

9. The cartridge as claimed in claim 1, wherein there are four belt guide rollers.

10. The cartridge as claimed in claim 9, wherein two belt guide rollers are located in the first extended portion of the belt path and two belt guide rollers are located in the second extended portion of the belt path.

11. The cartridge as claimed in claim 1, wherein the belt path has a generally bow tie-shaped configuration.

12. The cartridge as claimed in claim 1, wherein the belt path does not extend alongside the tape path along any substantial portion of either path.

13. The cartridge as claimed in claim 12, wherein the separation between the belt path and the tape path varies, and the minimum distance between the paths is not less than 0.125".

14. The cartridge as claimed in claim 13, wherein the separation between the tape path and belt path is at a minimum over a length of no more than 0.25" of either path.

15. The cartridge as claimed in claim 1, wherein the belt has a maximum wrap angle around each spool which is less than 120°.

16. The cartridge as claimed in claim 1, wherein the spool alignment axis is oriented in a direction which is not parallel or perpendicular to the front wall of the housing.

17. A belt-driven tape cartridge, comprising:

an outer housing having a front wall, spaced side walls and a rear wall, the front wall having an access opening for receiving a tape read/write head and a drive opening for receiving a driving roller;

first and second tape spools adapted to rotate in the housing, each spool having a center aligned on an alignment axis with the center of the other spool, the spool alignment axis extending at an angle to the front wall of the housing;

a plurality of tape guides for guiding tape between the spools along a tape path extending across the access opening;

a drive roller at said drive opening and three belt guide rollers rotatably mounted at fixed positions in the housing;

an endless drive belt encircling said drive roller and belt guide rollers in a belt path comprising a first tape contacting said portion contacting tape on the first spool, a second tape contacting said portion contacting tape on the second spool, a first extended portion extending from said first tape contacting portion around said drive roller and one belt guide roller to said second tape contacting portion and a second extended portion extending from said second tape contacting portion around two belt guide rollers to said first tape contacting portion, whereby movement of the drive belt in opposite directions will move said tape back and forth between the spools and across the access opening;

the housing front wall having a width of approximately 3.18"; and the length of the housing in a direction perpendicular to the housing front wall being greater than the width of the housing across the front wall.

18. The cartridge as claimed in claim 17, wherein the spool alignment axis extends at an angle in the range from 50° to 70° to the front wall of the housing.

19. The cartridge as claimed in claim 17, wherein the drive belt has a length in the range from approximately 14" to approximately 16".

20. The cartridge as claimed in claim 17, wherein the tape has a length of greater than 850 feet.

21. The cartridge as claimed in claim 17, wherein the tape has a length in the range from 850" to 1200'.

22. The cartridge as claimed in claim 17, wherein said tape path between said spools measured from the point at which said tape leaves one spool to the point at which said tape arrives at the other spool when substantially all of the tape is wound on one of the spools is approximately 7".

23. The cartridge as claimed in claim 17, wherein said tape path between said spools measured from the point at which said tape leaves one spool to the point at which said tape arrives at the other spool when substantially all of the tape is wound on one of the spools is in the range from approximately 7" to approximately 8.5".

24. The cartridge as claimed in claim 17, wherein the spacing between the centers of the spools is greater than 1.25" and less than 2.75".

25. The cartridge as claimed in claim 24, wherein the spacing is in the range from approximately 1.40" to approximately 1.56".

26. The cartridge as claimed in claim 17, wherein the spacing between the centers of the spools is greater than the spacing between the centers of the spools in a conventional mini cartridge and less than an interior width of the housing measured between opposite side walls of the housing at said forward end portion.

27. The cartridge as claimed in claim 17, wherein said belt guide rollers include a first belt guide roller on the same side of said spool alignment axis as said drive roller, and second and third belt guide rollers on the opposite side of said spool alignment axis, said third belt guide roller being positioned closer to said drive roller than said second belt guide roller, and the first tape spool being positioned closer to said drive roller than said second tape spool, said drive roller and belt guide rollers each having a center, a first line extending directly between the centers of the drive roller and third belt guide roller being spaced from the center of the first tape spool by a first distance, a second line extending directly between the centers of the first and second belt guide rollers being spaced from the center of the second tape spool by a second distance, each of said lines being positioned outwardly from the respective spool centers, and said first distance being greater than said second distance.

28. The cartridge as claimed in claim 27, wherein said first distance is approximately 0.37" and said second distance is approximately 0.19".

29. The cartridge as claimed in claim 27, wherein the spacing between the drive roller and third belt guide roller is in the range from approximately 2.5" to approximately 2.75".

30. The cartridge as claimed in claim 27, wherein the spacing between the first and second belt guide rollers is in the range from approximately 2.6" to approximately 2.9".

* * * * *

UNITED STATES PATENT AND TRADEMARK OFFICE
CERTIFICATE OF CORRECTION

PATENT NO. : 5,734,538
DATED : March 31, 1998
INVENTOR(S) : Xiaohong Hu and Rayburn Johnson It is certified that error appears in the above-indentified patent and that said Letters Patent is hereby corrected as shown below:

- Column 11, claim 21, line 7: after "from" delete "850" " and insert --850'--.

Signed and Sealed this

Twenty-first Day of July, 1998

Attest:

Attesting Officer

BRUCE LEHMAN

Commissioner of Patents and Trademarks